(12) United States Patent
Nakashiba

(10) Patent No.: US 7,249,334 B2
(45) Date of Patent: Jul. 24, 2007

(54) METHOD FOR GENERATING TIMING CONSTRAINTS OF LOGIC CIRCUIT

(75) Inventor: Takafumi Nakashiba, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 281 days.

(21) Appl. No.: 11/121,083

(22) Filed: May 4, 2005

(65) Prior Publication Data

US 2005/0251780 A1   Nov. 10, 2005

(30) Foreign Application Priority Data

May 7, 2004   (JP) .............. 2004-138916

(51) Int. Cl.
   *G06F 17/50*   (2006.01)
(52) U.S. Cl. ................. 716/6; 716/7; 703/16
(58) Field of Classification Search .......... 716/6, 716/7; 703/16
   See application file for complete search history.

(56) References Cited

U.S. PATENT DOCUMENTS

| | | | | |
|---|---|---|---|---|
| 5,128,737 A | * | 7/1992 | van der Have | 257/503 |
| 5,475,607 A | * | 12/1995 | Apte et al. | 716/10 |
| 5,883,808 A | * | 3/1999 | Kawarabayashi | 716/2 |
| 5,917,728 A | * | 6/1999 | Ueda | 716/18 |
| 5,956,257 A | * | 9/1999 | Ginetti et al. | 716/3 |
| 6,367,060 B1 | * | 4/2002 | Cheng et al. | 716/10 |
| 6,618,834 B2 | | 9/2003 | Takeyama et al. | |
| 6,678,871 B2 | | 1/2004 | Takeyama et al. | |
| 2002/0073389 A1 | * | 6/2002 | Elboim et al. | 716/6 |
| 2004/0225981 A1 | * | 11/2004 | Cocchini | 716/9 |

FOREIGN PATENT DOCUMENTS

| | | |
|---|---|---|
| JP | 10-187787 | 7/1998 |
| JP | 2002-149730 | 5/2002 |

OTHER PUBLICATIONS

Drissi et al., "Submodule Construction for Timed Systems", Proceedings of the 41st IEEE Conference on Decision and Control, vol. 1, Dec. 10-12, 2001, pp. 28-33.*

* cited by examiner

*Primary Examiner*—Phallaka Kik
(74) *Attorney, Agent, or Firm*—McDermott Will & Emery LLP

(57) ABSTRACT

In hierarchical design of a logic circuit by utilizing lower-level blocks of the logic circuit, data on the logic circuit with the hierarchical structure, library data holding primitive information on the logic circuit and timing constraints on the lower-level blocks are input at a data input step. Based on these input data, it is determined whether or not interface specifications of timing constraints on the lower-level blocks match each other at a matching determination step before a constraint converting step of converting the timing constraints on the lower-level blocks into a timing constraint on a higher-level block. Accordingly, it is possible to avoid generation of an excessively reduced or rigorous timing constraint on the higher-level block resulting from mismatching between interface specifications of timing constraints on the lower-level blocks.

12 Claims, 15 Drawing Sheets

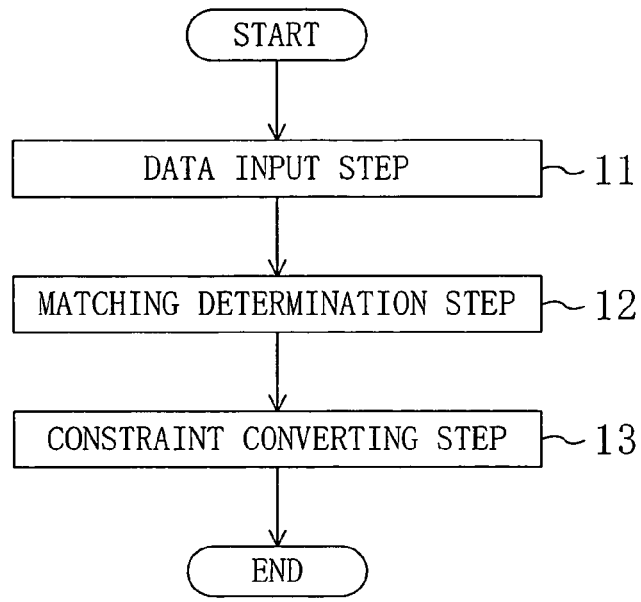
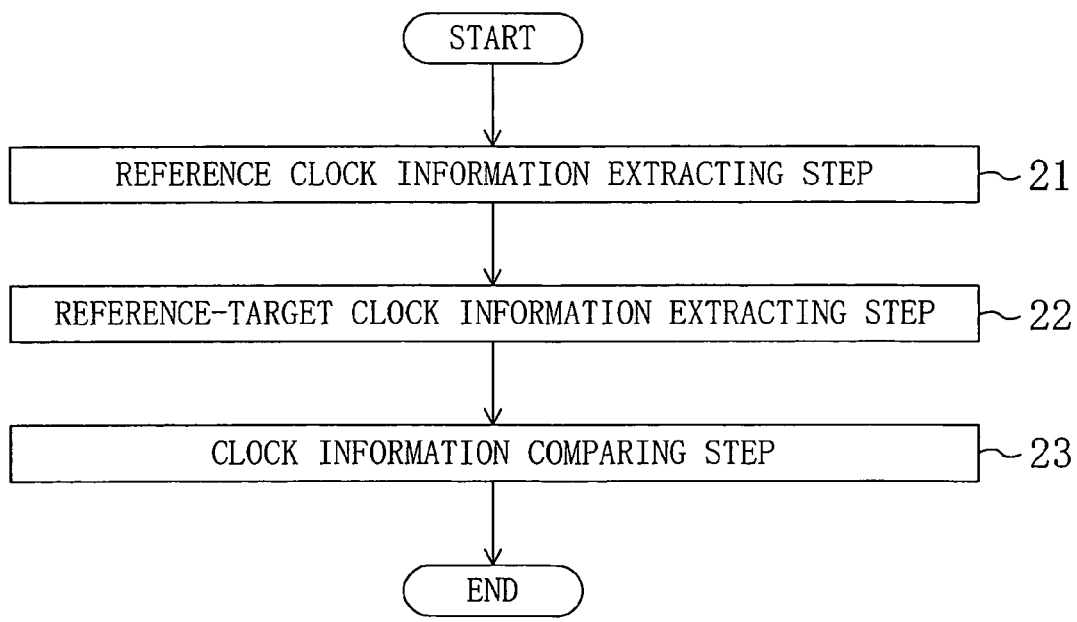

FIG. 3 - Prior Art
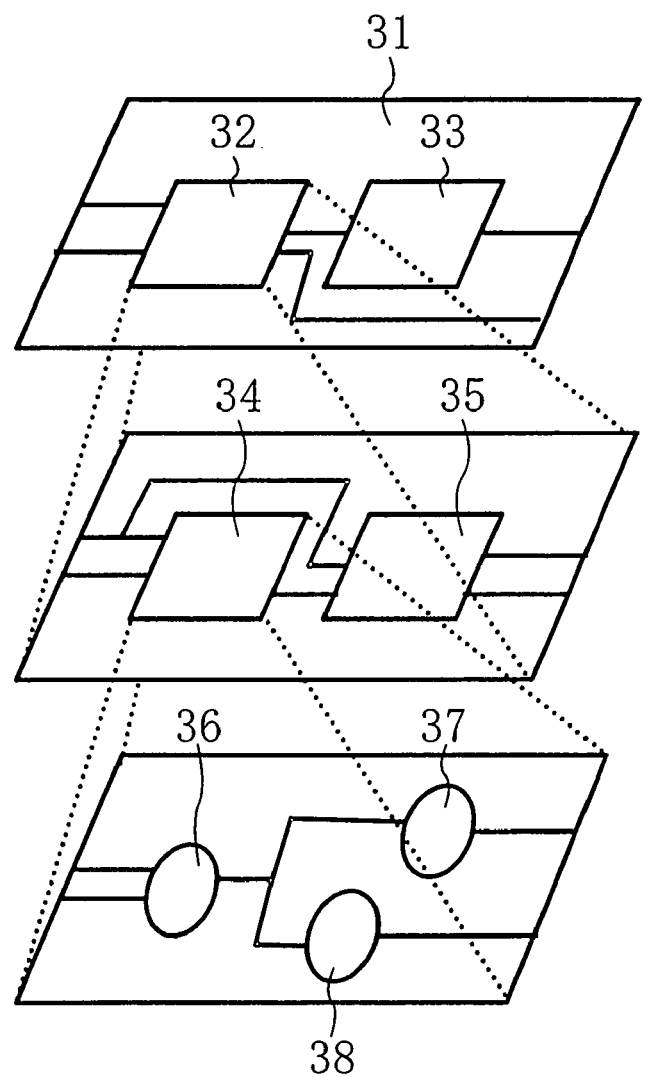

FIG. 4 - Prior Art
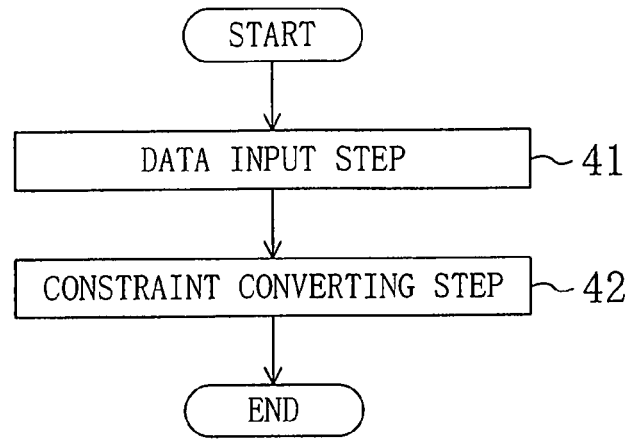
FIG. 5 - Prior Art
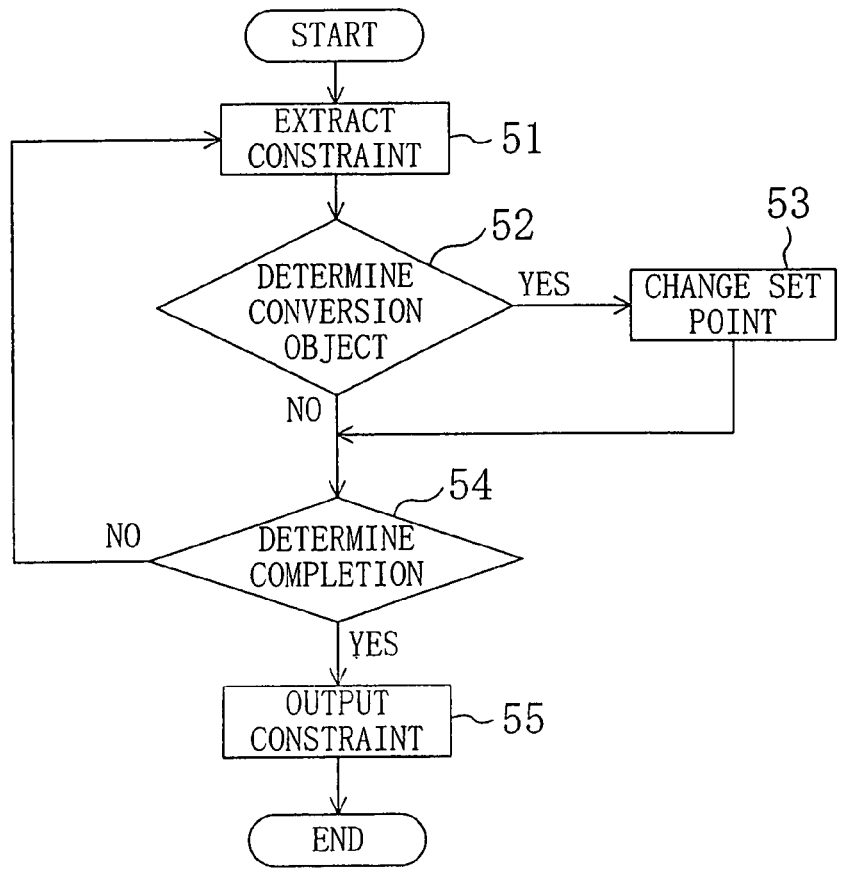

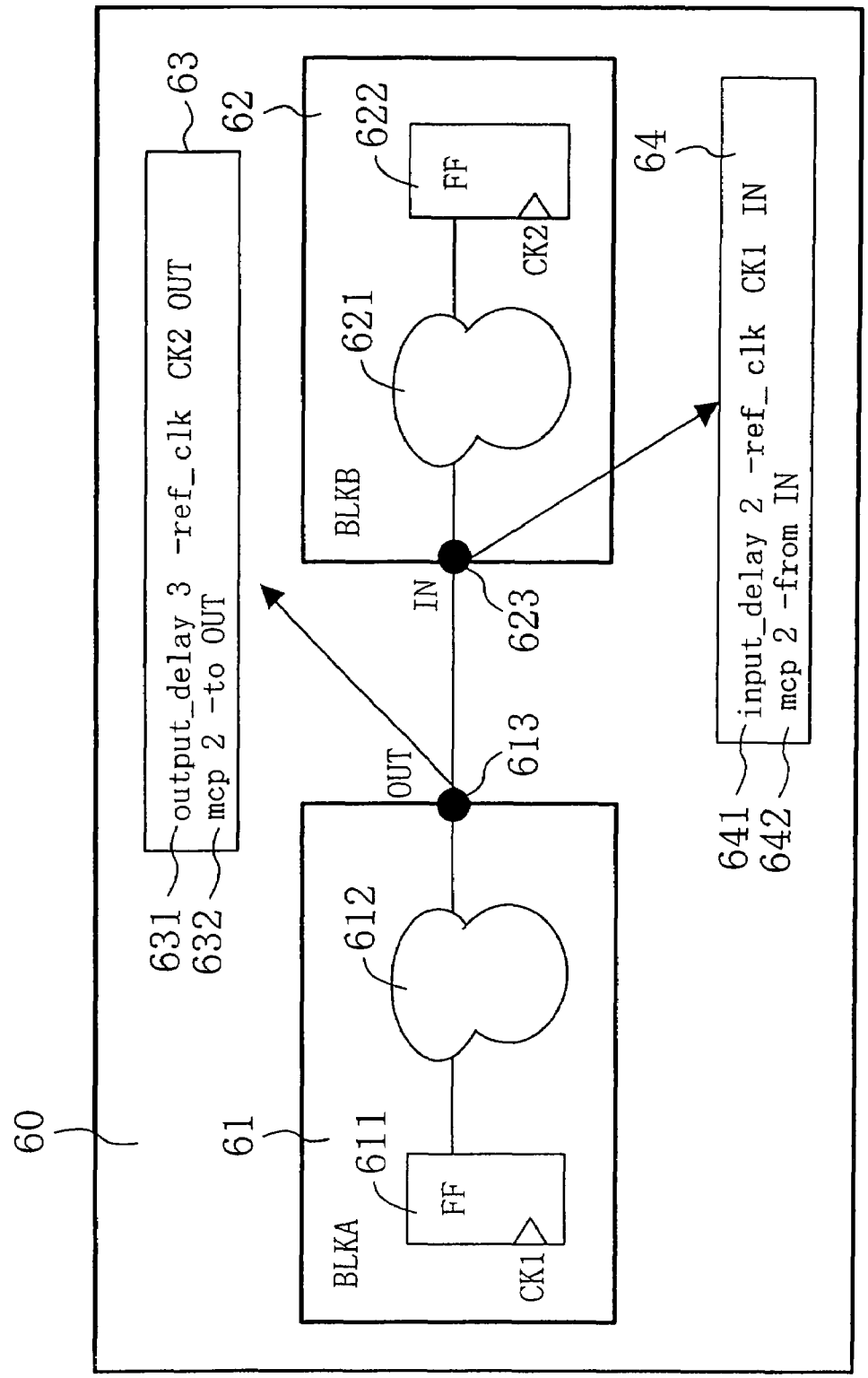
FIG. 6 - Prior Art

FIG. 7 - Prior Art

```
mcp 2 -through BLKA/OUT
mcp 2 -through BLKB/IN
```

FIG. 13

```
Value = PATH REQUEST TIME − max(CONSTRAINT REQUEST TIME USING INPUT PIN AS START POINT) − max(CONSTRAINT REQUEST TIME USING OUTPUT PIN AS END POINT)
    REDUCED CONSTRAINT   :   PERMISSIBLE VALUE < Value
    VALID                :   0 ≦ Value ≦ PERMISSIBLE VALUE
    RIGOROUS CONSTRAINT  :   Value < 0
```

FIG. 16

●*THERE IS POSSIBILITY OF MISMATCHING BETWEEN INTERFACE SPECIFICATIONS ON BLOCKS
PATH REQUEST TIME (CK->CK) : 10ns
FF->BLKA/OUT(output) : 7ns <---------> 8ns : BLKB/IN(input) -> FF
=> INPUT/OUTPUT DELAY VALUE IS EXCESSIVELY SMALL

FIG. 17

| DRIVER | | | RECEIVER | | |
|---|---|---|---|---|---|
| BLOCK NAME (PIN NAME) | REFERENCE CLOCK (CYCLE) | INPUT/ OUTPUT DELAY VALUE | BLOCK NAME (PIN NAME) | REFERENCE CLOCK (CYCLE) | INPUT/ OUTPUT DELAY VALUE |
| BLKA(OUT) | CK(10ns) | 3ns | BLKB(IN) | CK(10ns) | 2ns |

FIG. 18

| DRIVER | | | RECEIVER | | |
|---|---|---|---|---|---|
| BLOCK NAME (PIN NAME) | REFERENCE CLOCK (CYCLE) | INPUT/ OUTPUT DELAY VALUE | BLOCK NAME (PIN NAME) | REFERENCE CLOCK (CYCLE) | INPUT/ OUTPUT DELAY VALUE |
| BLKA(OUT) | CK(10ns) | 6ns | BLKB(IN) | CK(10ns) | 5ns |

US 7,249,334 B2

METHOD FOR GENERATING TIMING CONSTRAINTS OF LOGIC CIRCUIT

CROSS-REFERENCE TO RELATED APPLICATION

This Non-provisional application claims priority under 35 U.S.C. § 119(a) on Patent Application No. 2004-138916 filed in Japan on May 7, 2004, the entire contents of which are hereby incorporated by reference.

BACKGROUND OF THE INVENTION

The present invention relates to methods for generating timing constraints of logic circuits and particularly to a method for generating a timing constraint on a higher-level block in hierarchical design without an error.

With recent miniaturization in semiconductor fabrication processes, logic circuits to be designed have become larger in scale and more complicated. Therefore, hierarchical design in which a logic circuit to be implemented is divided into a plurality of partial circuits each having a specific function and the partial circuits are designed in parallel has been adopted in most cases.

FIG. 3 illustrates an example of a hierarchically designed logic circuit. A highest-level block 31 represents a whole logic circuit to be designed and includes circuit blocks 32 and 33 respectively representing partial circuits. The circuit block 32 includes circuit blocks 34 and 35 respectively representing partial circuits. The circuit block 34 includes primitive circuits 36, 37 and 38 and is at the lowest level.

Timing design of a logic circuit is generally carried out by using a logic synthesis tool, a logic optimization tool, a timing analysis tool and other tools and needs circuit constraints that define circuit specifications to be implemented. These circuit constraints include a timing constraint such as a constraint defining a signal transmission time from an element in a circuit to another element to be connected thereto.

In performing timing designs on blocks at respective levels in a hierarchical structure, a timing constraint is required for each block. If a whole logic circuit is to be designed, a timing constraint on the highest-level block is generated. The timing constraint on the highest-level block is generated by a designer based on circuit specifications. In general, timing constraints on lower-level blocks are repeatedly generated based on the timing constraint on the higher-level block, thereby designing a desired logic circuit. Such a technique is disclosed in Japanese Unexamined Patent Publication (Kokai) No. 10-187787, for example.

In addition to the technique of generating timing constraints on lower-level blocks based on a timing constraint on a higher-level block described above, a technique of generating a timing constraint on a higher-level block based on existing timing constraints on lower-level blocks has been proposed to share design resources. This technique is often adopted for an SOC design in which functions, which were previously implemented with a plurality of chips in the past, are integrated into one chip.

FIG. 4 is a flowchart showing process steps of a proposal of a timing constraint generating method for generating a timing constraint on a higher-level block based on existing timing constraints on lower-level blocks. In FIG. 4, step 41 is a data input step of inputting data on a logic circuit having a hierarchical structure, library data holding primitive information on the logic circuit and timing constraints on lower-level blocks of the logic circuit. Step 42 is a constraint converting step of converting the input constraints on the lower-level blocks into a constraint on the higher-level block.

Procedures according to the timing constraint generating method thus constructed will be described with reference to FIGS. 5 and 6.

FIG. 5 is a flowchart showing the constraint converting step 42 shown in FIG. 4 in detail. FIG. 6 is a diagram showing examples of a logic circuit to which data has been input and timing constraints. In FIG. 6, reference numeral 60 denotes a higher-level block representing a whole logic circuit shown in the drawing. A lower-level block BLKA61 and a lower-level block BLKB62 are at a level immediately below the higher-level block 60. The lower-level block BLKA61 includes a flip-flop 611 and a combinational circuit 612. The lower-level block BLKB62 includes a flip-flop 622 and a combinational circuit 621. The flip-flop 611 in the lower-level block BLKA61 receives a clock CK1 and the flip-flop 622 in the lower-level block BLKB62 receives a clock CK2. A timing constraint 63 is set at a block pin OUT613 of the lower-level block BLKA61. This timing constraint 63 includes an output delay constraint 631 and a multi-cycle constraint 632. A timing constraint 64 is set at a block pin IN623 of the lower-level block BLKB62. This timing constraint 64 includes an input delay constraint 641 and a multi-cycle constraint 642.

Now, a flow of the constraint converting step shown in FIG. 5 will be described with reference to FIG. 6.

First, at step 51, a timing constraint on a lower-level block is extracted. Then, at step 52, it is determined whether the extracted timing constraint is an object of conversion or not. For example, in the logic circuit shown in FIG. 6, if the extracted timing constraint is the output delay constraint 631, this extracted timing constraint is determined to be unnecessary for the higher-level block whereas if the extracted timing constraint is the multi-cycle constraint 632, this constraint is determined to be necessary. In the case of the determination to be an object of conversion, a set point at which the extracted timing constraint is set is switched from a point in the lower-level block to a point in the higher-level block at step 53. For example, a set point for the multi-cycle constraint 632 is changed from "OUT" in the lower-level block to a "BLKA/OUT" in the higher-level block.

On the other hand, in the case of the determination not to be an object of conversion at step 52, it is determined whether all the timing constraints are extracted or not at step 54. If one or more timing constraints have not been extracted yet, the process returns to step 51. After all the timing constraints have been extracted, at least one converted timing constraint is output at step 55. This converted timing constraint is a timing constraint on the higher-level block 60 as shown in FIG. 7, for example. Specifically, the set point is switched in such a manner that "mcp 2—to OUT", i.e., the multi-cycle constraint 632 in the timing constraint 63 which has been set at the block pin OUT613 of the lower-level block BLKA61 shown in FIG. 6, is changed into "mcp 2—through BLKA/OUT" shown in FIG. 7. Then, "mcp 2—through BLKA/OUT" is output as a timing constraint on the higher-level block. The same holds for the timing constraint 64 at the block pin IN623 of the lower-level block BLKB62.

In the timing constraint generating method as described above, however, if an extracted timing constraint is a timing constraint on a lower-level block and reflected as a timing constraint on a higher-level block, e.g., the multi-cycle constraint as described above, multi-cycle constraints on lower-level blocks are used as a timing constraint on a higher-level block without change, though the clocks CK1 and CK2 referred to by the respective two lower-level blocks 61 and 62 shown in FIG. 6 differ from each other and do not match each other. That is, the matching between interface specifications of the lower-level blocks at the same level is not taken into consideration in this way. Accordingly, if a timing constraint on a higher-level block is generated based on timing constraints on a plurality of lower-level blocks exhibiting no matching, the timing constraint on the higher-level block might be too reduced or too rigorous. In this case, debugging for analyzing an error occurring in interface specifications between the lower-level blocks at the same level is needed or there arises a drawback in which timing designs for the lower-level blocks need to be performed again because circuit specifications are not satisfied.

SUMMARY OF THE INVENTION

It is therefore an object of the present invention to generate a timing constraint on a higher-level block without an error even when interface specifications of existing timing constraints on a plurality of lower-level blocks do not match each other in generating the timing constraint on the higher-level block based on the existing timing constraints on the lower-level blocks.

In order to achieve this object, in a method according to the present invention, it is determined whether or not interface specifications of existing timing constraints on a plurality of lower-level blocks match each other in advance in generating a timing constraint on a higher-level block based on the timing constraints on the lower-level blocks.

In addition, according to the present invention, if it is determined that such interface specifications do not match each other, an appropriate edit is performed on the timing constraints on the lower-level blocks exhibiting mismatching so that an appropriate timing constraint, i.e., which is neither too reduced nor too rigorous, is obtained as a timing constraint on the higher-level block.

Specifically, a method according to the present invention is a method for generating, in a logic circuit having a hierarchical structure including a plurality of lower-level blocks and at least one higher-level block, a timing constraint on the higher-level block based on timing constraints on the respective lower-level blocks. The method includes: a data input step of inputting data on the logic circuit having the hierarchical structure, library data holding primitive information on the logic circuit and the timing constraints on the respective lower-level blocks; and a matching determination step of determining whether or not interface specifications of timing constraints on at least two of the lower-level blocks which are to be connected together match each other.

In an aspect of the present invention, the interface specifications are information included in the timing constraints on said at least two lower-level blocks and include one of reference clock information, timing exception information and either input delay information or output delay information, the reference clock information is clocks referred to by said at least two lower-level blocks, timing exception information is used for changing timings of said at least two lower-level blocks, and each of the input delay information and the output delay information is an external delay constraint set at an input pin or an output pin of one of said at least two lower-level blocks.

In another aspect of the present invention, the matching determination step includes: a reference clock information extracting step of extracting reference clock information referred to for the input delay information or the output delay information set at the input pin or the output pin of the lower-level block; a reference-target clock information extracting step of extracting reference clock information on another one of said at least two lower-level blocks having a start point of a path passing through the input pin or reference clock information on another one of said at least two lower-level blocks having an end point of a path passing through the output pin; and a clock information comparing step of comparing the reference clock information extracted at the reference clock information extracting step and the reference clock information extracted at the reference-target clock information extracting step with each other.

In still another aspect of the present invention, the matching determination step includes: a timing exception information extracting step of extracting the timing exception information set at the input pin or the output pin of the lower-level block; a connected-block timing exception information extracting step of extracting connected-block timing exception information set at an output pin of one of said at least two lower-level blocks to which the lower-level block having the input pin is to be connected or connected-block timing exception information set at an input pin of one of said at least two lower-level blocks to which the lower-level block having the output pin is to be connected; and a timing exception information comparing step of comparing the timing exception information extracted at the timing exception information extracting step and the connected-block timing exception information extracted at the connected-block timing exception information extracting step with each other.

In yet another aspect of the present invention, the matching determination step includes: an input/output delay information extracting step of extracting the input delay information or the output delay information set at the input pin or the output pin of the lower-level block; a connected-block input/output delay information extracting step of extracting connected-block output delay information or connected-block input delay information set at an output pin or an input pin of another one of said at least two lower-level blocks to which the input pin or the output pin for the input delay information or the output delay information is to be connected; a path request time calculating step of calculating, based on reference clock information at a start point or an end point of a path passing through the input pin or the output pin from which the input delay information or the output delay information has been extracted at the input/output delay information extracting step and also passing through the output pin or the input pin from which the connected-block output delay information or the connected-block input delay information has been extracted at the connected-block input/output delay information extracting step, a maximum permissible value of a signal transmission time from the start point of the path to the end point of the path; a constraint request time calculating step of calculating, based on the input delay information or the output delay information extracted at the input/output delay information extracting step and reference clock information at an end point or a start point of a path passing through the input pin or the output pin of the lower-level block at which the input delay information or the output delay information has been set, a maximum constraint request time of a signal transmission time in the lower-level block in a case where the input pin of the lower-level block is the start point or the output pin of the lower-level block is the end point; a permissible value specifying step of specifying a permissible value serving as a reference for the matching determination; and an input/output delay information determination step of determining, based on the maximum permissible value of the signal transmission time from the start point of the path to the end point of the path calculated at the path request time calculating step, the maximum constraint request time of the signal transmission time in the lower-level block calculated at the constraint request time calculating step and the permissible value specified at the permissible value specifying step, validity of the input delay information or the output delay information set at the input pin or the output pin of the lower-level block.

In another aspect of the present invention, the method further includes a warning displaying step of displaying a warning indicating mismatching portions in the case of determining that mismatching is present at the matching determination step.

In another aspect of the present invention, the method further includes a timing constraint editing step of performing an edit on timing constraints on the mismatching portions indicated by the warning at the warning displaying step such that the mismatching portions match each other.

In another aspect of the present invention, the method further includes a constraint converting step of converting, based on a result of the edit of the timing constraints on said at least two lower-level blocks having the mismatching portions performed at the timing constraint editing step, the timing constraints on the lower-level blocks into a timing constraint on the higher-level block in the case of determining that mismatching is present at the matching determination step.

In another aspect of the present invention, the timing constraint on the higher-level block and the timing constraints on the lower-level blocks after the edit are output at the constraint converting step.

In another aspect of the present invention, the timing constraints on the lower-level blocks includes at least one of: a higher-level block conversion timing constraint to be converted into the timing constraint on the higher-level block at the constraint converting step; and an exclusive lower-level block timing constraint to be converted at the constraint converting step and to be excluded in the timing constraint on the higher-level block.

In another aspect of the present invention, the higher-level block conversion timing constraint is a multi-cycle constraint.

In another aspect of the present invention, the exclusive lower-level block timing constraint is an input/output delay constraint.

As described above, according to the present invention, timing constraints on a plurality of lower-level blocks are input at a data input step, and then it is determined whether or not interface specifications between the timing constraints on the lower-level blocks match each other. Accordingly, generation of an excessively reduced or rigorous timing constraint on a higher-level block is prevented.

Specifically, in an aspect of the present invention, it is determined whether or not matching is present between clock information as interface specifications referred to by respective two lower-level blocks to be connected via a path.

In another aspect of the present invention, it is determined whether or not matching is present between timing exception information as interface specifications on respective two lower-level blocks to be connected via a path.

In still another aspect of the present invention, with respect to a path passing through an input pin or an output pin of a lower-level block, for example, a maximum constraint request time of a signal transmission time from the start point to the end point of the path in the lower-level block is subtracted from a maximum permissible value of the signal transmission time. If the subtraction result is equal to or more than zero and less than a permissible value, input delay information or output delay information set at the input or output pin of the lower-level block is determined to be a valid constraint. If the subtraction result is less than zero, i.e., negative, the information is determined to be a rigorous constraint. If the subtraction result exceeds the permissible value, the information is determined to be a reduced constraint.

In yet another aspect of the present invention, if it is determined that mismatching is present at a matching determination step, a warning indicating mismatching portions is displayed.

In still another aspect of the present invention, if the warning is displayed, an edit is conducted such that the mismatching portions match each other.

In another aspect of the present invention, timing constraints on lower-level blocks which have matched each other by the edit are converted into a timing constraint on a higher-level block.

BRIEF DESCRIPTION OF THE DRAWINGS

FIG. 1 is a flowchart showing process steps according to a first embodiment of the present invention.

FIG. 2 is a flowchart showing a matching determination step according to the first embodiment.

FIG. 3 is a view illustrating an example of a logic circuit having a hierarchical structure.

FIG. 4 is a flowchart showing process steps as an example of a conventional timing constraint generating method.

FIG. 5 is a flowchart showing a constraint converting step in detail.

FIG. 6 is a diagram illustrating examples of a logic circuit to which data has been input and timing constraints.

FIG. 7 shows an example of outputs of timing constraints.

FIG. 13 shows an example of criteria in matching determination.

FIG. 16 shows an example of a warning display.

FIG. 17 is a table showing an example of an edit screen.

FIG. 18 is a table showing an example of an edit result.

DESCRIPTION OF THE PREFERRED EMBODIMENTS

Hereinafter, preferred embodiments of the present invention will be described with reference to the accompanying drawings.

Embodiment 1

First, a first embodiment of the present invention will be described with reference to FIGS. 1, 2 and 8.

FIG. 1 is a flowchart showing process steps according to the first embodiment. In FIG. 1, step 11 is a data input step of inputting data on a logic circuit having a hierarchical structure, library data holding primitive information on the logic circuit and timing constraints on a plurality of circuit blocks at one or more lower levels of the logic circuit. Step 12 is a matching determination step of determining whether or not interface specifications of timing constraints on the lower-level blocks match each other based on the data that has been input at the data input step 11. Step 13 is a constraint converting step of converting timing constraints on the lower-level blocks after the matching determination into at least one constraint on a higher-level block. FIG. 1 for this embodiment is different from FIG. 4 for the conventional example in that the matching determination step 12 is provided between the data input step 11 and the constraint converting step 13.

FIG. 2 shows the matching determination step 12 in detail. In FIG. 2, step 21 is a reference clock information extracting step of extracting reference clock information included in input delay information which has been set at an input pin of a lower-level block and reference clock information included in output delay information which has been set at an output pin of a lower-level block. Step 22 is a reference-target clock information extracting step of extracting reference-target clock information on a start point of a path passing through the input pin used at the step 21 with respect to the input pin and on an end point of a path passing through the output pin used at the step 21 with respect to the output pin. Step 23 is a clock information comparing step of comparing reference clock information extracted at the step 21 and reference clock information extracted at the step 22 with each other and determining whether or not matching is present between these clock information.

Figure 8:
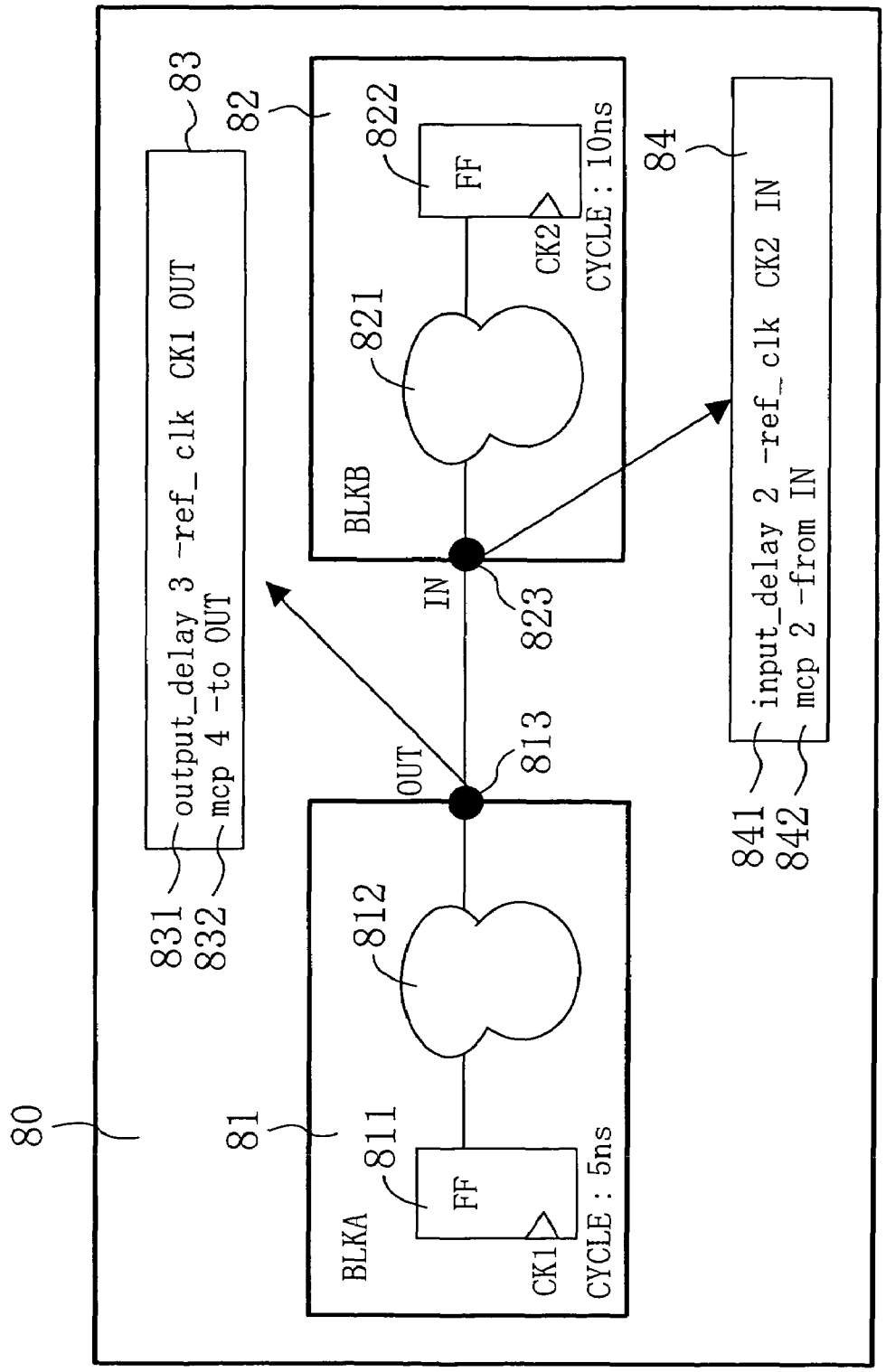
FIG. 8 is a diagram illustrating examples of a logic circuit to which data has been input and timing constraints.

FIG. 8 is a diagram showing an example of a logic circuit to which data has been input and examples of timing constraints. In FIG. 8, reference numeral 80 denotes a higher-level block representing a whole logic circuit shown in the drawing. A lower-level block BLKA81 and a lower-level block BLKB82 are at a level immediately below the higher-level block 80. The lower-level block BLKA81 includes a flip-flop 811 and a combinational circuit 812. The lower-level block BLKB82 includes a flip-flop 822 and a combinational circuit 821. The flip-flop 811 in the lower-level block BLKA81 receives a clock CK1 with a cycle of 5 ns and the flip-flop 822 in the lower-level block BLKB82 receives a clock CK2 with a cycle of 10 ns. A timing constraint 83 is set at a block pin OUT813 of the lower-level block BLKA81. This timing constraint 83 includes an output delay constraint 831 and a multi-cycle constraint 832. A timing constraint 84 is set at a block pin IN823 of the lower-level block BLKB82. This timing constraint 84 includes an input delay constraint 841 and a multi-cycle constraint 842.

Now, the timing constraint generating method shown in FIG. 1 will be described in detail with reference to FIGS. 2 and 8.

First, at the reference clock information extracting step 21 shown in FIG. 2, reference clock information for input/output delay information which has been set at a pin of a lower-level block is extracted. For example, in the logic circuit shown in FIG. 8, if the output delay constraint 831 which has been set at a pin OUT813 of the lower-level block BLKA81 is selected, the clock CK1 is extracted as a reference clock.

Next, at the reference-target clock information extracting step 22, reference clock information at a start point or an end point of a path passing through the pin of the lower-level block is extracted. A search for the path passing through the pin is determined by input/output attributes of a selected pin. For example, if an input pin is selected, a search is made in the input direction and the start point of the path is extracted. In the same manner, if an output pin is selected, a search is made in the output direction and the end point of the path is extracted. Specifically, in FIG. 8, if the pin OUT813 is selected, a search is made in the output direction and the flip-flop 822 is extracted as the end point of the path, thereby extracting the clock CK2 as a reference clock.

Lastly, in the clock information comparing step 23, the reference clock extracted at the reference clock information extracting step 21 and the reference clock extracted at the reference-target clock information extracting step 22 are compared with each other.

In this embodiment, the cycle of the reference clock CK1 extracted at the reference clock information extracting step 21 is 5 ns, and the cycle of the reference clock extracted at the reference-target clock information extracting step 22 is 10 ns. Accordingly, with respect to the pin OUT813, it is determined that mismatching is present between interface specifications of the two timing constraints 83 and 84 on the lower-level blocks, i.e., between the reference clock information (5 ns) CK1 and the reference clock information (10 ns) CK2.

Embodiment 2

Now, a second embodiment of the present invention will be described with reference to FIGS. 8, 9 and 10.

Figure 9:
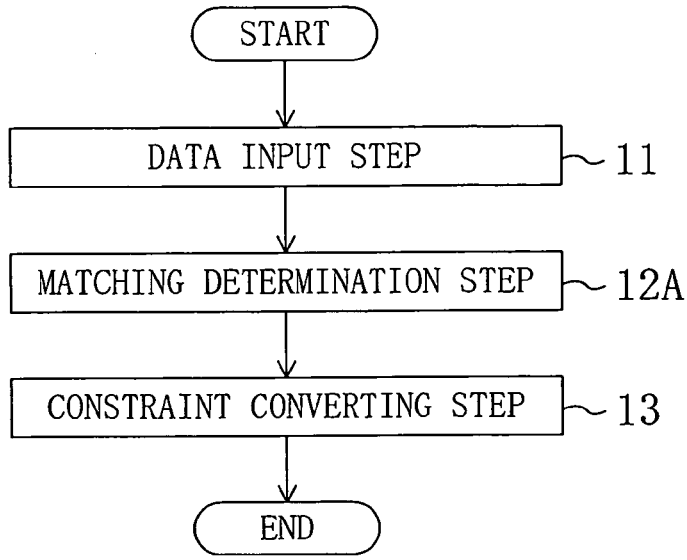
FIG. 9 is a flowchart showing process steps according to a second embodiment of the present invention.

FIG. 9 is a flowchart showing process steps according to the second embodiment. The second embodiment is different from the first embodiment in that a matching determination step 12A of determining whether or not interface specifications match each other by comparing timing exception information (timing constraints) for changing timings of lower-level blocks to be connected to each other is provided instead of the matching determination step 12 of determining whether or not interface specifications match each other by comparing reference clock information. In this embodiment, the same reference numeral denotes the same component.

Figure 10:
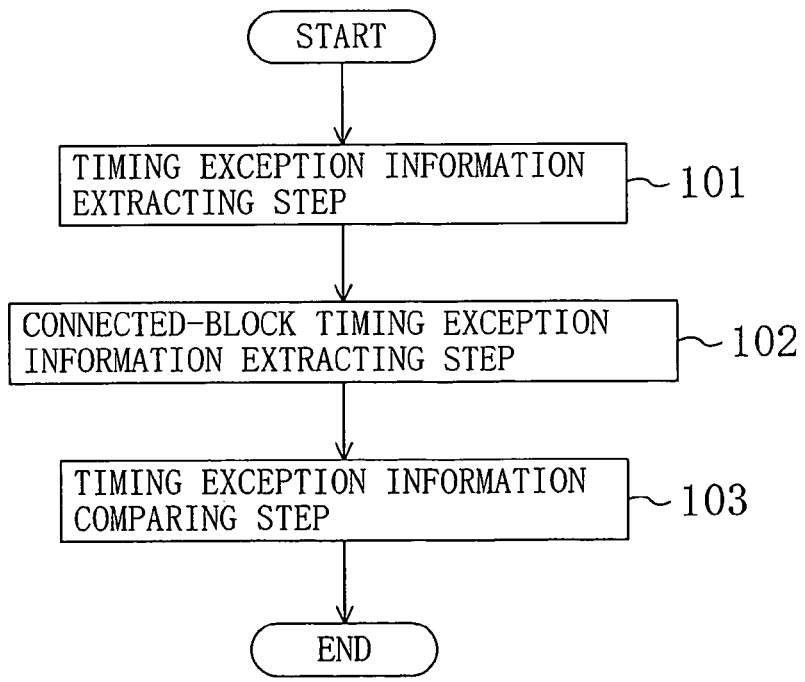
FIG. 10 is a flowchart showing process steps in a matching determination step according to the second embodiment.

FIG. 10 shows the matching determination step 12A in detail. In FIG. 10, step 101 is a timing exception information extracting step of extracting timing exception information which has been set at an input pin or an output pin of a lower-level block. Step 102 is a connected-block timing exception information extracting step of extracting timing exception information which has been set at an input pin or an output pin of a lower-level circuit block to be connected to the lower-level circuit block from which the timing exception information has been extracted at the timing exception information extracting step 101. Step 103 is a timing exception information comparing step of comparing the timing exception information extracted at the timing exception information extracting step 101 and the timing exception information extracted at the connected-block timing exception information extracting step 102.

Now, the timing constraint generating method shown in FIG. 9 according to this embodiment will be described with reference to FIGS. 8 and 10.

First, at the timing exception information extracting step 101 shown in FIG. 10, timing exception information which has been set at a pin of a lower-level block is extracted. For example, in FIG. 8, it is assumed that a multi-cycle constraint (timing exception information) 832 which has been set at a pin OUT813 of a lower-level block BLKA81 is extracted.

Next, in the connected-block timing exception information extracting step 102, timing exception information which has been set at an input pin or an output pin of another lower-level block to be connected to the pin of the lower-level block is extracted. In this case, a search for a path to be connected to the pin is determined by input/output attributes of a selected pin. For example, if an input pin is selected, a search is made in the input direction and a pin of another lower-level block to be connected is extracted. If an output pin is selected, a search is made in the output direction and a pin of another lower-level block to be connected is extracted. Specifically, in FIG. 8, if the output pin OUT813 is selected, a search is made in the output direction so that a pin IN823 of another lower-level block BLKB82 to be connected to the lower-level block BLKA81 is extracted, thereby extracting a multi-cycle constraint 842.

Lastly, at the timing exception information comparing step 103, the timing exception information extracted at the timing exception information extracting step 101 and the timing exception information extracted at the connected-block timing exception information extracting step 102 are compared with each other.

In this embodiment, the multiplier in the multi-cycle constraint 832 extracted at the timing exception information extracting step 101 is four, and the multiplier in the multi-cycle constraint 842 extracted at the connected-block timing exception information extracting step 102 is two. Accordingly, with respect to the pin OUT813, it is determined that mismatching is present between the two multi-cycle constraints 842 and 832 that are interface specifications between the timing constraints 83 and 84 on the two lower-level blocks.

Embodiment 3

Now, a third embodiment of the present invention will be described with reference to FIGS. 11, 12, 13 and 14.

Figure 11:
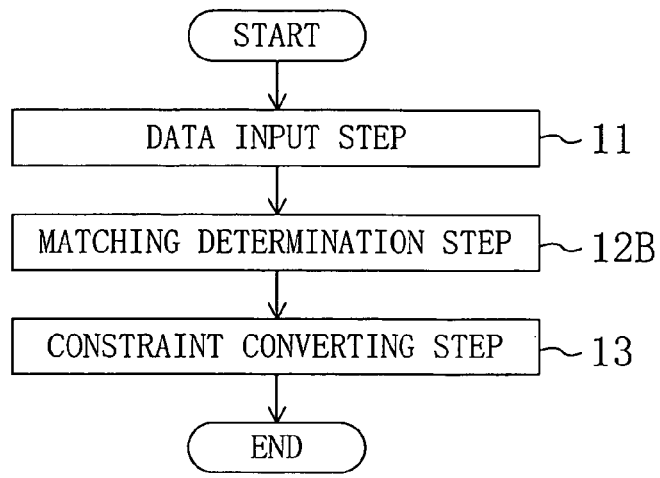
FIG. 11 is a flowchart showing process steps according to a third embodiment of the present invention.

FIG. 11 shows a timing constraint generating method according to the third embodiment. The third embodiment shown in FIG. 11 is different from the first embodiment shown in FIG. 1 in that a matching determination step 12B of determining whether or not interface specifications match each other by determining the validity of input/output delay information is provided instead of the matching determination step 12 of determining whether or not interface specifications match each other by comparing reference clock information with each other. The input/output delay information is an output delay constraint as an external constraint on an output pin or an input delay constraint as an external constraint on an input pin.

Figure 12:
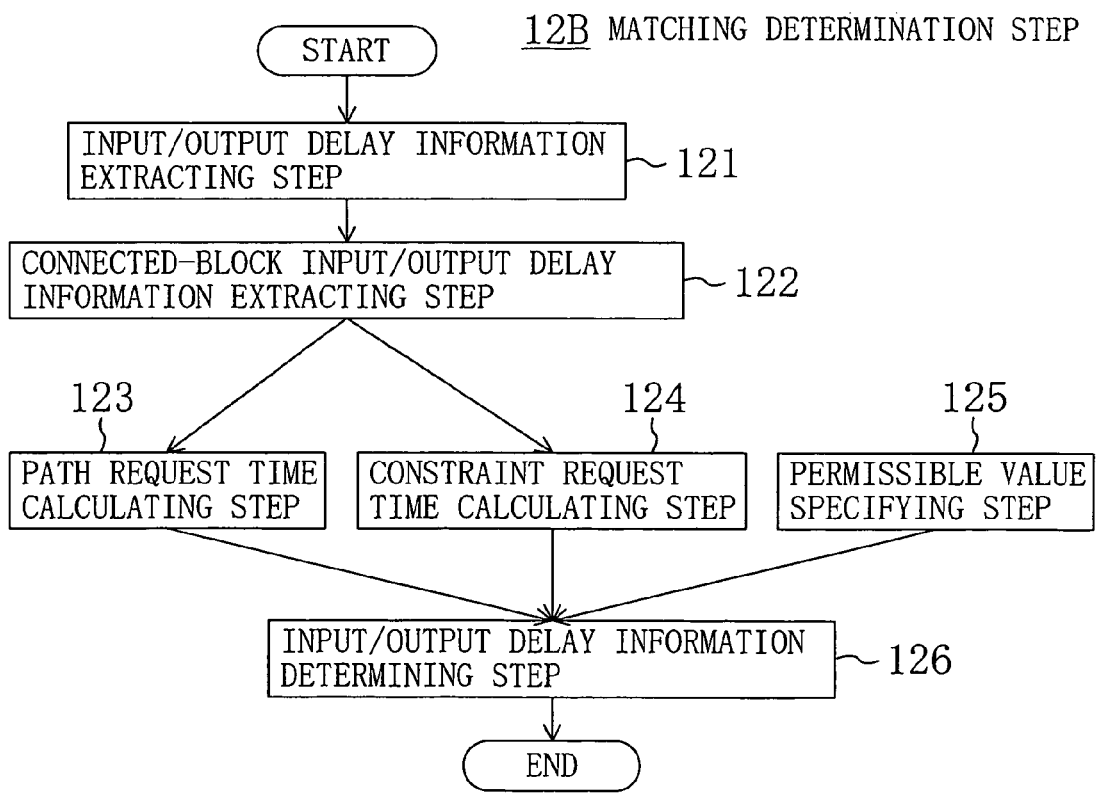
FIG. 12 is a flowchart showing a matching determination step according to the third embodiment.

FIG. 12 is a flowchart showing process steps of the matching determination step 12B shown in FIG. 11. Step 121 is an input/output delay information extracting step of extracting input/output delay information from a timing constraint which has been set at a pin of a lower-level block. Step 122 is a connected-block input/output delay information extracting step of extracting input/output delay information which has been set at an input pin or an output pin of another lower-level block to be connected to the pin from which the input/output delay information has been extracted at the step 121.

In FIG. 12, step 123 is a path request time calculating step of calculating a maximum permissible value of a signal transmission time from a start point to an end point of a path passing through the pins from which the information has been extracted at the steps 121 and 122. Step 124 is a constraint request time calculating step of calculating a maximum request time for a timing constraint in the signal transmission time between the input or output pins from which the information has been extracted at the steps 121 and 122 and an end point or a start point of the pass passing through the input or output pins, in the same manner as in the step 123. Step 125 is a permissible value specifying step of specifying a permissible value serving as a reference value in determining whether or not timing constraints match each other based on the input/output delay information. Step 126 is an input/output delay information determining step of determining whether a relationship between the maximum permissible value and the timing constraint request time calculated at the steps 123 and 124, respectively, is valid or not by comparison with the permissible value specified at the step 125.

Figure 14:
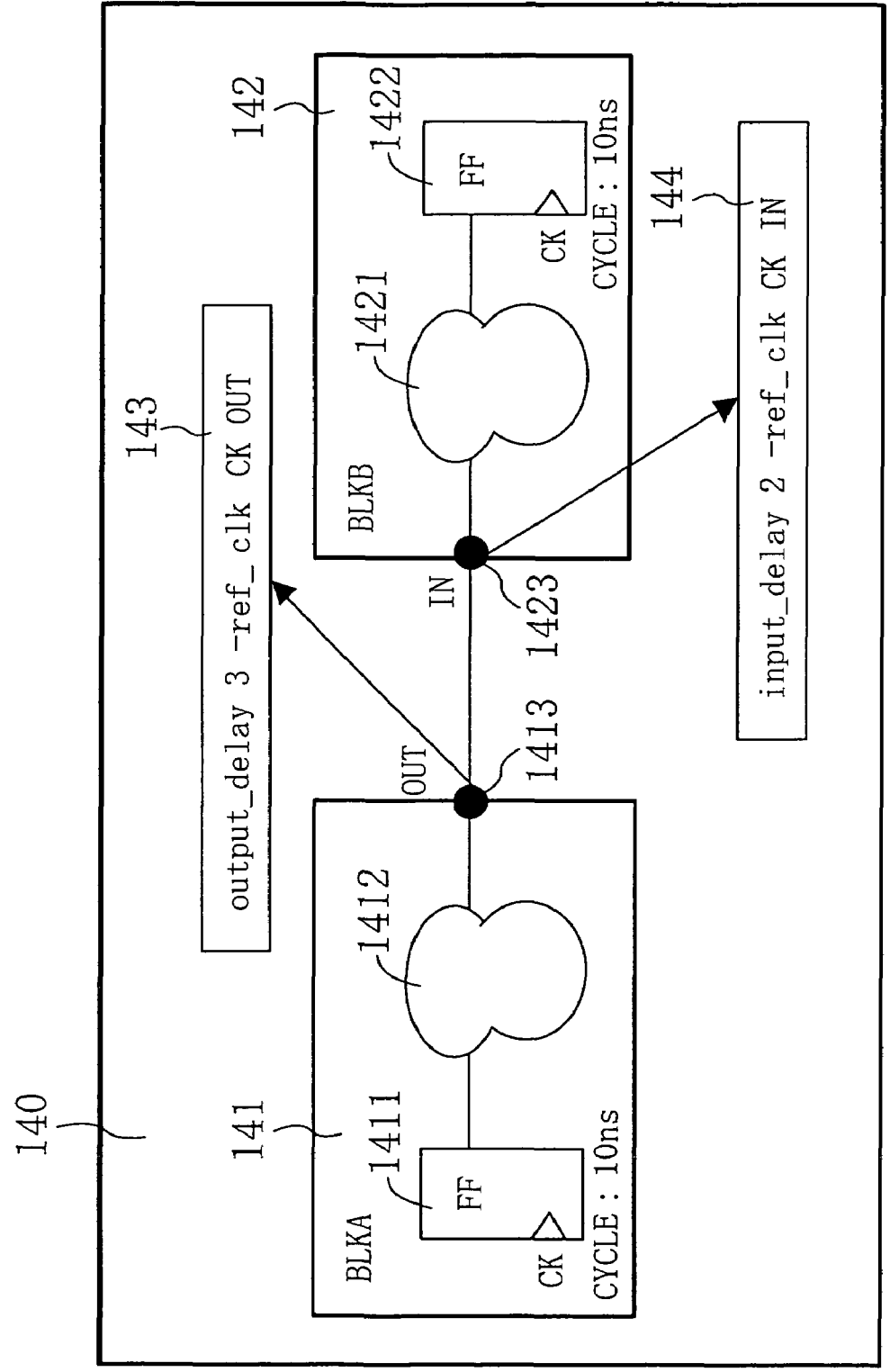
FIG. 14 is a diagram illustrating examples of a logic circuit to which data has been input and timing constraints.

FIG. 14 is a diagram showing an example of a logic circuit to which data has been input and examples of timing constraints. In FIG. 14, reference numeral 140 denotes a higher-level block representing a whole logic circuit shown in the drawing. A lower-level block BLKA141 and a lower-level block BLKB142 are at a level immediately below the higher-level block 140. The lower-level block BLKA141 includes a flip-flop 1411 and a combinational circuit 1412. The lower-level block BLKB142 includes a flip-flop 1422 and a combinational circuit 1421. The flip-flop 1411 in the lower-level block BLKA141 receives a clock CK with a cycle of 10 ns and the flip-flop 1422 in the lower-level block BLKB142 receives a clock CK with a cycle of 10 ns. A timing constraint 143 is set at a block pin OUT1413 of the lower-level block BLKA141. This timing constraint 143 is an output delay constraint in FIG. 14. A timing constraint 144 is set at a block pin IN1423 of the lower-level block BLKB142. This timing constraint 144 is an input delay constraint in FIG. 14.

Now, the timing constraint generating method of this embodiment will be described with reference to the specific examples shown in FIGS. 12 and 14.

First, at the input/output delay information extracting step 121 shown in FIG. 12, input/output delay information which has been set at a pin of a lower-level block is extracted. For example, in FIG. 14, it is assumed that the timing constraint 143 which has been set at the pin OUT1413 of the lower-level block BLKA141 is extracted.

Next, at the connected-block input/output delay information extracting step 122, input/output delay information which has been set at a pin of another lower-level block to be connected to the pin of the lower-level block is extracted. In this case, a search for the pin is determined by input/output attributes of a selected pin. For example, if an input pin is selected, a search is made in the input direction, and if an output pin is selected, a search is made in the output direction. Specifically, in FIG. 14, if the pin OUT1413 is selected, a search is made in the output direction and the pin IN1423 is extracted.

Then, at the path request time calculating step 123, a maximum permissible value of a signal transmission time is calculated based on a reference clock at the start or end point of the path passing through the pin at which the input/output delay information extracted at the input/output delay information extracting step 121 has been set and the pin at which the input/output delay information extracted at the connected-block input/output delay information extracting step 122 has been set. In this case, a search for the path passing through a pin is determined by input/output attributes of the selected pin. For example, if an input pin is selected, a search is made in the input direction so that the start point of the path is extracted. If an output pin is selected, a search is made in the output direction so that the end point of the path is extracted. Specifically, in FIG. 14, if the pin OUT1413 is selected, a search is made in the output direction so that flip-flop 1422 as the end point of the path is extracted, thereby extracting a clock CK as a reference clock. If the pin IN1423 is selected, a search is made in the input direction so that the flip-flop 1411 as the start point of the path is extracted, thereby extracting a clock CK as a reference clock. For simplification of a model, a set-up time and a hold time of a flip-flop, a clock skew and a wiring delay time, for example, are disregarded. Accordingly, in this embodiment, the cycle of the reference clock CK is 10 ns and the maximum permissible value of the transmission time is 10 ns.

Thereafter, at the constraint request time calculating step 124, a maximum permissible value of a signal transmission time between the pin and the start or end point of the path is calculated based on the extracted input/output delay information and a reference clock at the start or end point of the path passing through the pins at which the input/output delay information has been set. In this case, a search for the path passing through the pins is determined by input/output attributes of a selected pin. For example, if an input pin is selected, a search is made in the output direction so that the end point of the path is extracted. If an output pin is selected, a search is made in the input direction so that the start point of the path is extracted. Specifically, in FIG. 14, if the pin OUT1413 is selected, a search is made in the input direction, so that the flip-flop 1411 serving as the start point of the path is extracted and a clock CK is extracted as a reference clock. If the pin IN1423 is selected, a search is made in the output direction, so that the flip-flop 1422 serving as the end point of the path is selected and a clock CK is extracted as a reference clock. For simplification of a model, a set-up time and a hold time of a flip-flop, a clock skew and a wiring delay time, for example, are disregarded. Accordingly, in this embodiment, since the cycle of the reference clock CK is 10 ns and the delay value of the timing constraint 143 is 3 ns, the maximum permissible value of a transmission time from the flip-flop 1411 to the pin OUT1413 is 7 ns (10 ns−3 ns.) In the same manner, the maximum permissible value of a transmission time from the pin IN1423 to the flip-flop 1422 is 8 ns (10 ns−2 ns.)

Subsequently, at the permissible value specifying step 125, a permissible value in matching determination is specified. In this embodiment, this permissible value is specified at 2 ns.

Lastly, at the input/output delay information determining step 126, validity of the input/output delay information is determined based on the two maximum permissible values of transmission times calculated at the path request time calculating step 123 and the constraint request time calculating step 124 and the permissible value specified at the permissible value specifying step 125. FIG. 13 shows an example of criteria in the input/output delay information determining step 126. Hereinafter, an equation expressed as "Value=pass request time−max (constraint request time using an input pin as a start point)−max (constraint request time using an output pin as an end point)" in FIG. 13 will be specifically explained with reference to FIG. 14. To calculate a delay value (Value) between the pin OUT1413 and the pin IN1423, the maximum value of a signal transmission time starting from the input pin (i.e., the maximum constraint request time of a signal transmission time from the pin IN1423 to the flip-flop 1422) and the maximum value of a signal transmission time ending at the output pin (i.e., the maximum constraint request time of a signal transmission time from the flip-flop 1411 to the pin OUT1413) are subtracted from the time required for a path from the flip-flop 1411 to the flip-flop 1422. In this embodiment, since the cycles of the clocks CK received by the flip-flop 1411 in the lower-level block BLKA141 and the flip-flop 1422 in the lower-level block BLKB142 are both 10 ns, the path request time is 10 ns. On the other hand, since an external constraint on an input delay which has been set at the input pin IN1423 is 2 ns, max (constraint request time starting from the input pin) is 10−2=8 (ns). Since an external constraint on an output delay which has been set at the output pin OUT1413 is 3 ns, max (constraint request time ending at the output pin) is 10−3=7 (ns). Accordingly, Value=10−8−7=−5<0 (ns). That is, according to the criteria shown in FIG. 13, the timing constraint on the lower-level block is rigorous. Accordingly, with respect to the pin OUT1413, it is determined that mismatching is present between the timing constraint 144 and the timing constraint 143 in interface specifications between the timing constraints on the two lower-level blocks.

Embodiment 4

Now, a fourth embodiment of the present invention will be described with reference to FIGS. 15, 16, 17, 18 and 19.

Figure 15:
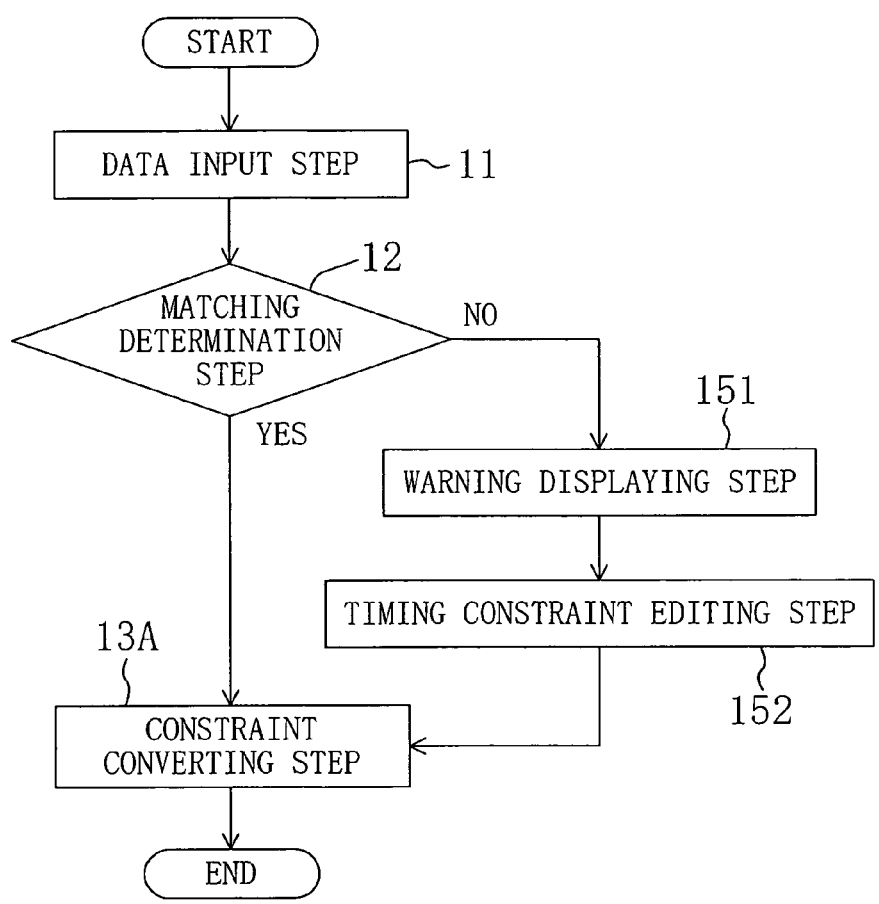
FIG. 15 is a flowchart showing process steps according to a fourth embodiment of the present invention.

FIG. 15 shows a timing constraint generating method according to the fourth embodiment. The fourth embodiment shown in FIG. 15 is different from the first, second and third embodiments in that if it is determined that mismatching is present at the matching determination step 12, a warning indicating the absence of matching is displayed at a warning displaying step 151 and then at a timing constraint editing step 152, an edit is performed so as to obtain matching.

If an edit is performed at the timing constraint editing step 152 and it is determined that matching is present at the matching determination step 12, the process proceeds to a constraint converting step 13A and timing constraints on a plurality of lower-level blocks are converted into a timing constraint on a higher-level block.

Now, the timing constraint generating method of this embodiment will be described with reference to specific examples shown in FIGS. 14, 16, 17 and 18 and the flowcharts of FIGS. 12 and 15.

Process steps before the matching determination at the matching determination step 12 are the same as those of the third embodiment shown in FIG. 12.

If it is determined that matching is not present at the matching determination step 12, a warning indicating mismatching portions is displayed at the warning displaying step 151. FIG. 16 shows an example of the warning. This warning indicates that an input/output delay value is too small and, if nothing is done, interface specifications between lower-level blocks will not match each other.

Then, at the timing constraint editing step 152, a screen for editing the mismatching portions is displayed. FIG. 17 shows an example of the edit screen. For each of a driver side and a receiver side of a signal, information such as a block name (pin name), a reference clock (cycle) and an input/output delay value regarding the mismatching portions indicated by the warning are displayed. The input/output delay value is edited so as to make interface specifications between lower-level blocks match each other in consideration of status of the lower-level blocks based on the warning. FIG. 18 shows a result of this edit. FIG. 18 shows that the input/output delay value (output delay value) of a driver has been corrected from 3 ns to 6 ns and the input/output delay value (input delay value) of a receiver has been corrected from 2 ns to 5 ns. In this manner, max (constraint request time starting from an input pin) is 10−5=5 (ns) and max (constraint request time ending at an output pin) is 10−6=4 (ns). Accordingly, the delay value (Value)=10−5−4=1 (ns). If the permissible value is specified at 2 ns at the permissible value specifying step 125, the relationship of 0≦delay value (value)≦permissible value (2 ns) is established. Then, the output delay value and the input delay value are determined to be valid constraints.

Figure 19:
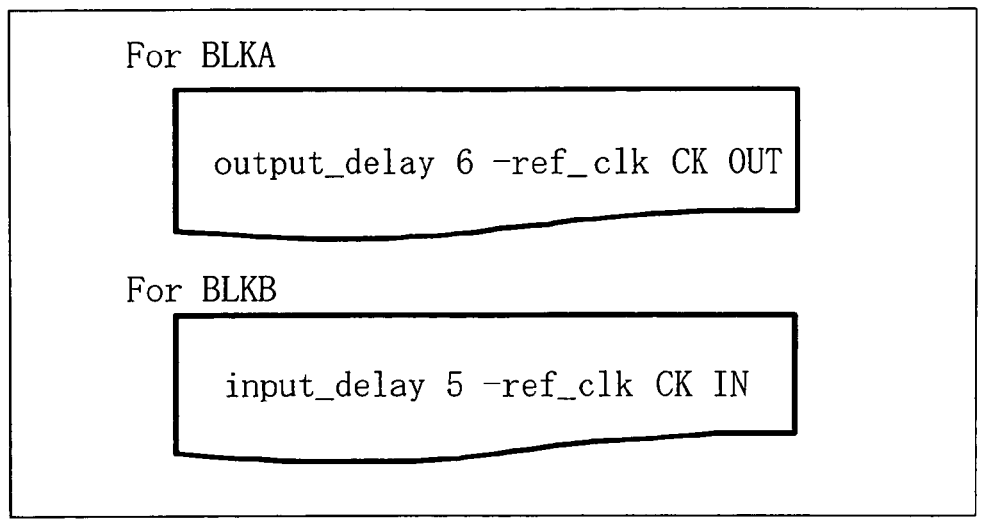
FIG. 19 shows an example of outputs of timing constraints.

After the edit has been finished, at least one timing constraint on a higher-level block and timing constraints on lower-level blocks are generated at the constraint converting step 13A. FIG. 19 shows an example of outputs of these timing constraints. This example shows input/output delay constraints (exclusive lower-level block timing constraints) out of timing constraints on lower-level blocks. Because of the absence of constraints as objects of conversion, no timing constraint on a higher-level block is output. If a multi-cycle constraint (a higher-level block conversion timing constraint) to be output as a timing constraint on a higher-level block as shown in FIG. 7 is included as a timing constraint on a lower-level block, a converted timing constraint on a higher-level block is output at the constraint converting step 13A shown in FIG. 15 together with timing constraints on lower-level blocks edited at the timing constraint editing step 152.

In the first through fourth embodiments, a timing constraint on a higher-level block is generated based on two lower-level circuit blocks. However, the present invention is not limited to these embodiments. The matching determination may be performed on interface specifications among three or more adjacent lower-level blocks.

What is claimed is:

1. A method for generating, in a logic circuit having a hierarchical structure including a plurality of lower-level blocks and at least one higher-level block, a timing constraint on the higher-level block based on timing constraints on the respective lower-level blocks, the method comprising:
    a data input step of inputting data on the logic circuit having the hierarchical structure, library data holding primitive information on the logic circuit and the timing constraints on the respective lower-level blocks; and
    a matching determination step of determining whether or not interface specifications of timing constraints on at least two of the lower-level blocks which are to be connected together match each other.

2. The method of claim 1, wherein the interface specifications are information included in the timing constraints on said at least two lower-level blocks and include one of reference clock information, timing exception information and either input delay information or output delay information,
    the reference clock information is clocks referred to by said at least two lower-level blocks,
    timing exception information is used for changing timings of said at least two lower-level blocks, and
    each of the input delay information and the output delay information is an external delay constraint set at an input pin or an output pin of one of said at least two lower-level blocks.

3. The method of claim 2, wherein the matching determination step includes:
    a reference clock information extracting step of extracting reference clock information referred to for the input delay information or the output delay information set at the input pin or the output pin of the lower-level block;
    a reference-target clock information extracting step of extracting reference clock information on another one of said at least two lower-level blocks having a start point of a path passing through the input pin or reference clock information on another one of said at least two lower-level blocks having an end point of a path passing through the output pin; and
    a clock information comparing step of comparing the reference clock information extracted at the reference clock information extracting step and the reference clock information extracted at the reference-target clock information extracting step with each other.

4. The method of claim 2, wherein the matching determination step includes:
    a timing exception information extracting step of extracting the timing exception information set at the input pin or the output pin of the lower-level block;
    a connected-block timing exception information extracting step of extracting connected-block timing exception information set at an output pin of one of said at least two lower-level blocks to which the lower-level block having the input pin is to be connected or connected-block timing exception information set at an input pin of one of said at least two lower-level blocks to which the lower-level block having the output pin is to be connected; and
    a timing exception information comparing step of comparing the timing exception information extracted at the timing exception information extracting step and the connected-block timing exception information extracted at the connected-block timing exception information extracting step with each other.

5. The method of claim 2, wherein the matching determination step includes:
    an input/output delay information extracting step of extracting the input delay information or the output delay information set at the input pin or the output pin of the lower-level block;
    a connected-block input/output delay information extracting step of extracting connected-block output delay information or connected-block input delay information set at an output pin or an input pin of another one of said at least two lower-level blocks to which the input pin or the output pin for the input delay information or the output delay information is to be connected;
    a path request time calculating step of calculating, based on reference clock information at a start point or an end point of a path passing through the input pin or the output pin from which the input delay information or the output delay information has been extracted at the input/output delay information extracting step and also passing through the output pin or the input pin from which the connected-block output delay information or the connected-block input delay information has been extracted at the connected-block input/output delay information extracting step, a maximum permissible value of a signal transmission time from the start point of the path to the end point of the path;

a constraint request time calculating step of calculating, based on the input delay information or the output delay information extracted at the input/output delay information extracting step and reference clock information at an end point or a start point of a path passing through the input pin or the output pin of the lower-level block at which the input delay information or the output delay information has been set, a maximum constraint request time of a signal transmission time in the lower-level block in a case where the input pin of the lower-level block is the start point or the output pin of the lower-level block is the end point;

a permissible value specifying step of specifying a permissible value serving as a reference for the matching determination; and an input/output delay information determination step of determining, based on the maximum permissible value of the signal transmission time from the start point of the path to the end point of the path calculated at the path request time calculating step, the maximum constraint request time of the signal transmission time in the lower-level block calculated at the constraint request time calculating step and the permissible value specified at the permissible value specifying step, validity of the input delay information or the output delay information set at the input pin or the output pin of the lower-level block.

6. The method of claim 2, further comprising a warning displaying step of displaying a warning indicating mismatching portions in the case of determining that mismatching is present at the matching determination step.

7. The method of claim 6, further comprising a timing constraint editing step of performing an edit on timing constraints on the mismatching portions indicated by the warning at the warning displaying step such that the mismatching portions match each other.

8. The method of claim 7, further comprising a constraint converting step of converting, based on a result of the edit of the timing constraints on said at least two lower-level blocks having the mismatching portions performed at the timing constraint editing step, the timing constraints on the lower-level blocks into a timing constraint on the higher-level block in the case of determining that mismatching is present at the matching determination step.

9. The method of claim 8, wherein the timing constraint on the higher-level block and the timing constraints on the lower-level blocks after the edit are output at the constraint converting step.

10. The method of claim 8, wherein the timing constraints on the lower-level blocks includes at least one of:

a higher-level block conversion timing constraint to be converted into the timing constraint on the higher-level block at the constraint converting step; and an exclusive lower-level block timing constraint to be converted at the constraint converting step and to be excluded in the timing constraint on the higher-level block.

11. The method of claim 10, wherein the higher-level block conversion timing constraint is a multi-cycle constraint.

12. The method of claim 10, wherein the exclusive lower-level block timing constraint is an input/output delay constraint.

* * * * *